United States Patent Office 3,282,838
Patented Nov. 1, 1966

3,282,838
PETROLEUM LIQUIDS CONTAINING AMINE SALTS OF MOLYBDIC ACID
Edwin C. Knowles, Poughkeepsie, N.Y., Edward L. Kay, Akron, Ohio, and Howard V. Hess, Glenham, and George W. Eckert, Wappingers Falls, N.Y., assignors to Texaco Inc., New York, N.Y., a corporation of Delaware
No Drawing. Filed May 10, 1960, Ser. No. 28,000
10 Claims. (Cl. 252—49.7)

This invention relates to complex amine salts of inorganic oxidizing acids and to their method of production. In addition, it covers corrosion inhibited liquid petroleum hydrocarbons contaning members of the aforementioned amine salts.

An object of this invention is to provide and produce novel amine salts of inorganic oxidizing acids. Another object is to provide and produce novel petroleum hydrocarbon liquid compositions. Still another object is to provide and produce petroleum hydrocarbon liquids having improved anti-corrosive properties.

In accordance with the objects of the invention, we have discovered novel amine chromates and amine molybdates of the formula.

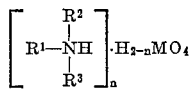

where $R^1$ is an alkyl radical, $R^2$ and $R^3$ are the same or different radicals selected from the group comprising hydrogen and alkyl, where M represents a chromic or molybdic ion of a valence of $+6$ and $n$ is an integer from 1 to 2 inclusively. It is to be noted that when $n=1$, the foregoing structural formula represents the amine acid salt and when $n=2$, it represents the amine neutral salt.

Specific examples of alkyl radicals contemplated for $R^1$, $R^2$, and $R^3$ in the foregoing structural formula are alkyl groups having from 1 to 30 carbon atoms such as methyl, ethyl, tertiary butyl, isooctyl, 1,1,3,3 tetramethyl butyl, dodecyl, tri-tertiarybutyl, tetra-tertiarybutyl, penta-tertiarybutyl, heptadecyl and 2,2,4,4 tetramethyl heptadecyl.

The amine salts of the invention are useful as surface active agents in non-aqueous systems, e.g., as emulsifying agents in soluble oils. The amount of amine salt employed in said systems is desirably between about 0.005 and 5 wt. percent. In addition, the amine salts of the invention having at least one tertiary carbon atom in the $R^1$ alkyl group have been found to be effective in retarding the corrosion of metals such as ferrous and non ferrous metals, e.g., zinc, cast iron and carbon steel, which come in contact with petroleum liquids such as crude oil, gasoline, kerosene, lube oil and fuel oil compositions. The corrosive tendency of the petroleum liquids is caused by the corrosive bodies found therein such as hydrogen sulfide and monobasic acids and/or by moisture associated with the petroleum liquid. We have found the corrosion of metals in contact with petroleum liquids can be substantially reduced by incorporating, preferably with agitation such as by stirring, a corrosion inhibiting amount, e.g., between about 0.005 and 5 wt. percent, preferably between about 0.01 and 1.0 wt. percent of the novel tertary alkyl amine salts into said liquid.

The amine chromate and molybdate salts are prepared by reacting chromic ($H_2CrO_4$) or molybdic acid ($H_2MoO_4$) with an alkyl amine. If an acid salt is desired, approximately 1:1 mol ratios of acid and amine reactants are employed. If a neutral salt is intended, a mol ratio of amine to acid of about 2:1 is used. Equations illustrating the formation of the acid and neutral salt are shown below:

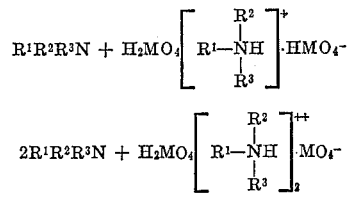

M, $R^1$, $R^2$ and $R^3$ are as heretofore defined

The acid reactant in the above equation can be prepared by any standard means such as mixing chromic oxide ($CrO_3$) or molybdic oxide ($MoO_3$) with water. Aqueous solutions of acid reactant having from about 20 to 40 wt. percent acid strength are preferred although higher and lower acid strengths are acceptable. The acid reactant may be alternatively prepared in situ or by simultaneously adding water and the metal oxide to the amine reactant. If the amine salt product is a solid in the reaction mixture it can be removed by simple filtration or by selective extraction of the salt with a liquid solvent followed by fractional distillation of the extract solution. If the salt product is a liquid, separation can be effected by extraction followed by distillation of the extractant or by decantation if the amine salt forms a separate liquid layer in the reaction mixture. The reaction between the amine and acid to form the salt product desirably takes place at a temperature between about 32 and 230° F. in a mol ratio of amine to acid between about 1:1 and 2:1.

One method of preparing the novel amine salts is the direct addition of water and the metal oxide to the amine, preferably with agitation while maintaining the reaction at a reduced temperature below about 100° F. to obviate the possibility of the production of tarry by-products. Since the reaction is exothermic, heat exchange means such as an icebath or heat exchange tubing within the reaction vessel are desirably employed. At the end of the addition period solvent which will selectively extract the amine salt product from the reaction mixture is advantageously added thereto. The extract solution is desirably dried utilizing a drying agent such as anhydrous calcium sulfate, calcium oxide or calcium chloride and then filtered to remove any undissolved particles. In any case whether or not the drying and filtering steps are employed the selective solvent and amine salt products can be separated from one another by subjecting the extract solution to fractional distillation.

Variations of the aforementioned procedures can be employed such as (1) adding the amine to the reactant acid rather than vice versa, (2) adding the amine reactant to a mixture of acid reactant and selective solvent for the amine salt product (3) adding selective solvent for the amine salt product to the amine-acid reaction mixture and refluxing the resultant mixture for a period of time, e.g., 1 to 20 hours, and (4) employing a selective solvent which forms an azeotrope with water thereby permitting the removal of water in the final reaction mixture by an azeotropic distillation rather than by filtration, decantation or ordinary distillation.

The amine reactants contemplated in the novel procedure are alkyl amines of the formula

where $R^1$, $R^2$ and $R^3$ are as heretofore defined. Specific examples of the amines contemplated herein are methyl amine, ethyl amine, isooctyl amine, tertiary octyl amine, dodecyl amine N,N didodecyl amine and N,N,N dimethyl tertiary octyl amine. In addition, we contemplate the use of mixtures of amines such as those hold under the tradenames Primene JM–T and Primene 81–R. Primene 81–R and Primene JM–T are a mixture of highly branched tertiary (t) alkyl primary amines wherein the alkyl configuration is essentially a repeating t-butyl group. A more specific definition of the composition of Primene 81–R and JM–T is found in Table A below:

TABLE A

*Properties of primene 81–R and JM–T*

| Properties | Primene 81-R | Primene JM-T |
|---|---|---|
| Formula | $t\text{-}C_{11}H_{23}NH_2$<br>$t\text{-}C_{12}H_{25}NH_2$<br>$t\text{-}C_{13}H_{27}NH_2$<br>$t\text{-}C_{14}H_{29}NH_2$ | $t\text{-}C_{18}H_{37}NH_2$<br>$t\text{-}C_{19}H_{39}NH_2$<br>$t\text{-}C_{20}H_{41}NH_2$<br>$t\text{-}C_{21}H_{43}NH_2$<br>$t\text{-}C_{22}H_{45}NH_2$ |
| Mol Weight | 171–213 | 269–325. |
| Average Mol Weight | 191 | 315. |
| Boiling Range | 5–90% at 221–238° C | 5–70% at 265–305° C. |
| Specific Gravity, 25° C | 0.813 | 0.840. |
| Refractive Index, 25° C | 1.423 | 1.456. |
| Flash Point (Tag., open cup) | 205° F | 265° F. |

Further data on Primene 81–R and JM–T are found in the booklet entitled, "Tertiary-Alkyl Primary Amines," dated October 1956 and published by the Rohm & Haas Company.

Specific examples of the selective solvents contemplated herein are benzene, toluene, xylene, petroleum ether and, in fact, any common organic solvent preferably having a boiling point lower than the amine salt to be extracted.

The alkyl amine salt products contemplated range in consistency from liquid to solid. The consistency of the salt is determined in part by the degree of branching of alkyl group(s) contained therein with straight chain alkyl groups favoring a solid consistency. The consistency is also determined in part by the molecular weight of the salt product. When the amine salt is to be used as corrosion inhibitors in petroleum hydrocarbon liquid it is desirable to fluidize the viscous and solid salt to aid in its incorporation into the petroleum liquids by dissolving these salts in a suitable hydrocarbon solvent such as benzene, petroleum ether or kerosene prior to their addition to the petroleum liquid. Alternatively, if selective solvent is employed in the preparation of the salt, the solvent-salt solution can be directly added to the petroleum liquid providing the solvent is compatible with the use of said liquid.

As heretofore mentioned the novel tertiary alkyl amine salts when incorporated in petroleum liquids in corrosion inhibiting amounts, e.g., between about 0.005 and 5 wt. percent, effectively repress the corrosive tendencies of these liquids. The corrosion inhibited compositions are prepared by adding the amine salt directly to the liquid to be inhibited at any suitable temperature, e.g., room temperature.

The equipment employed in the manufacture of the amine salts is suitably constructed of any acid resistant material such as austenitic stainless steel, glass lined metals or acid resistant plastic material.

The following examples further illustrate our invention. Examples I to X cover the preparation of the novel amine salts. Examples XI to XII relate to the preparation of corrosion inhibited petroleum liquid compositions and establish the outstanding corrosion inhibiting effect of the tertiary alkyl amine salts contemplated herein.

*Example I*

To a 3 necked 500 milliliter glass flask equipped with a thermometer, stirrer, dropping funnel and partially immersed in an ice water bath, there was added 49 g. (0.25 mol) of Primene 81–R. The stirrer was actuated and 100 g. of 30 wt. percent chromic acid (25 g. $CrO_3$+75 g. $H_2O$) were introduced into the flask by controlled metering utilizing the dropping funnel in a manner to maintain the exothermic reaction at a temperature below 100° F. At the end of the chromic acid addition, 74 grams of benzene were added, the stirring was stopped and the mixture was allowed to stand for several hours until a phase separation between the aqueous and benzene solutions in the reaction mixture was effected. The benzene and aqueous layers were separated employing a separatory funnel and the recovered benzene layer was dried over anhydrous calcium sulfate and filtered. The thus dried benzene amine chromate concentrate was a clear dark red liquid weighing 140 grams. Analysis indicated the product was Primene 81–R acid chromate of the formula $(t\text{-}C_{11}\text{-}C_{14} \text{ alkyl } NH_3)\cdot HCrO_4$ having a chromium and nitrogen content of 17 wt. percent and 4.5 wt. percent respectively.

*Example II*

The procedure of Example I was repeated with the exception that 400 g. (2.1 mol) of Primene 81–R, 100 g. (1.0 mol) of chromium trioxide, 100 mls. of water and 500 mls. of benzene were employed. The dried and filtered benzene concentrate was a clear dark red liquid weighing 870 g. Analysis found the product to be Primene 81–R neutral chromate of the formula $(t\text{-}C_{11}\text{-}C_{14} \text{ alkyl } NH_3)_2CrO_4$ having a chromium and nitrogen content of 10.4 wt. percent and 5.6 percent, respectively.

*Example III*

The procedure of Example I was repeated with the exception that 158 g. (0.5 mol) of Primene JM–T, 25 g. (0.25 mol) of chromium trioxide, 75 g. water and 187 g. of benzene were employed. The resultant benzene concentrate was a clear dark red liquid weighing 350 grams. Analysis identified the product as Primene JM–T neutral chromate of the formula $(t\text{-}C_{18}\text{-}C_{22} \text{ alkyl } NH_3)_2CrO_4$ having a chromium and nitrogen content of 7 wt. percent and 3.7 wt. percent respectively.

*Example IV*

The procedure of Example I was repeated with the exception that 80 g. (0.25 mol) of Primene JM–T, 25 g. (0.25 mol) of chromium trioxide, 75 g. water and 119 g. benzene were employed. The resultant filtered and dried benzene concentrate was a clear dark red liquid weighing 207 grams. Analysis identified the product as Primene JM–T acid chromate of the formula $(t\text{-}C_{18}\text{-}C_{22} \text{ alkyl } NH_3)\cdot HCrO_4$ having a chromium and nitrogen content of 12 wt. percent and 3.2 wt. percent respectively.

*Example V*

To a 3 necked 250 ml. glass flask equipped with a thermometer, stirrer, and dropping funnel and partially immersed in an ice bath, there was added 46 g. (0.25 mol) of n-dodecyl amine. The stirrer was actuated and 100 g. of 25 wt. percent chromic acid (25 g. $CrO_3$+75 g. $H_2O$) were introduced into the flask by controlled metering utilizing the dropping funnel in a manner to maintain the exothermic reaction at a temperature below 100° F. At the end of the chromic acid addition, the stirring was stopped and the reaction mixture was filtered. Eighty-seven grams of a pale yellow precipitate were collected. The solid product was identified as n-dodecyl amine acid chromate of the formula $(n\text{-}C_{12}H_{25}NH_3)\cdot HCrO_4$ having a chromium and nitrogen content of 17.2 wt. percent and 4.6 wt. percent, respectively.

*Example VI*

The procedure of Example V was repeated with the exception that 92 g. (0.5 mol) of n-dodecyl amine were used. A pale yellow colored precipitate weighing 153 grams was collected. The product was identified as n-dodecyl amine neutral chromate of the formula

having a chromium and nitrogen content of 10.7 wt. percent and 5.8 wt. percent, respectively.

Example VII

The procedure of Example V was repeated with the exception that 73 g. (1 mol) of tertiary butyl amine, 50 g. (0.5 mol) chromium trioxide and 173 g. water were employed. Seventy-two grams of red solid were recovered and identified as tertiary butyl amine neutral chromate of the formula

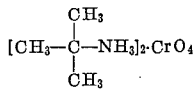

having a chromium and nitrogen content of 19.7 wt. percent and 10.6 wt. percent, respectively.

Example VIII

The procedure of Example VII was repeated with the exception that 100 g. (1.0 mol) of chromium trioxide were employed. The final reaction mixture was homogenous and 340 g. of a clear dark red aqueous liquid were isolated therefrom. The water component of the liquid was removed leaving a red solid identified as tertiary butyl amine acid chromate of the formula

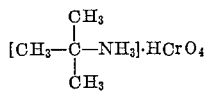

having a chromium and nitrogen content of 27.1 wt. percent and 7.3 wt. percent, respectively.

Example IX

To a 3-necked 1000 ml. glass flask partially immersed in an ice bath and equipped with a stirrer, thermometer and dropping funnel, there was added 200 g. (1.1 mol) of Primene 81–R followed by the incremental addition of 244 g. of 66 wt. percent molybdic acid (100 g. $H_2O$+144 $MoO_3$) and 200 mls. of benzene in a manner to maintain the reaction temperature below 100° F. At the end of the addition period the dropping funnel was replaced with a reflux condenser and the reaction mixture was refluxed for 12 hours. At the end of the reflux period the water and benzene layers forming the reaction mixture were separated. The water layer was discarded and the benzene layer subjected to distillation to remove benzene leaving 362 g. of a solvent free dark blue semi-solid. The product was found to contain 26.9 wt. percent Mo and was identified as Primene 81–R acid molybdate of the formula ($t$-$C_{11}$–$C_{14}$ alkyl $NH_3$)·$HMoO_4$. The theoretical molybdenum content of this salt is 27.2 wt. percent.

Example X

The procedure of Example IX was employed except 630 g. (2.0 mol) Primene JM–T, 50 mls. water and 200 mls. toluene were employed. Also, the reaction mixture was refluxed for 6 hours. At the end of the reflux period, the water and toluene layers were separated and the water layer was discarded. The toluene was removed by distillation leaving a dark blue liquid weighing 796 grams which was identified as Primene JM–T neutral molybdate of the formula ($t$-$C_{18}$–$C_{22}$ alkyl $NH_3$)$_2$·$MoO_4$. Analysis of the salt found that it contained 11.4 wt. percent molybdenum, 12.1 wt. percent theoretical.

Example XI

This example illustrates the corrosion inhibiting properties of the novel amine salts having at least one tertiary carbon atom when incorporated into gasoline containing 0.1 wt. percent propionic acid.

The corrosion test employed consisted of immersing a cold rolled steel metal strip or a strip of carburetor metal of 5 x 0.5 x 1/16 inch dimensions in 90 cc. of gasoline and 20 cc. of water contained in a 4-ounce bottle and the bottle is shaken for 15 seconds in a horiozntal position. The bottle is then turned to a vertical position and allowed to stand for 24 hours. At the end of the 24 hours period a reading is taken of the percent of surface area of the strip located in the gasoline phase which is rusted.

The gasoline stock employed has an API gravity of 57, a sulfur content of 0.2 and an initial boiling point of 90° F., a 50% boiling point of 205% F. and a final boiling point of 372° F.

The amine chromates employed were the chromates of Examples I–IV. The corrosion inhibited gasoline compositions were prepared by adding the amine chromates to the gasoline stock at room temperature and agitating until solution of the salt was accomplished. The data and results of the previously described test utilizing various amine chromate inhibitors at varying concentrations are reported below in Table B.

TABLE B

*Results of corrosion tests with amine salts of chromic acid as inhibitors in gasoline containing propionic acid*

| Amine: Chromate Salt Ingredient | Percent by Wt. of Amine Salt in Gasoline | Modified Quickie Corrosion Test | |
|---|---|---|---|
| | | Cold Rolled steel, Percent Rust | Carburetor Metal, Percent Rust |
| Primene 81–R: Acid Chromate | 0.100 | 10 | 0 |
| Primene 81–R: Neutral Chromate | 0.15 | 0 | 0 |
| Primene JM–T: Acid Chromate | 0.10 | 5 | 0 |
| Primene JM–T: Neutral Chromate | 0.10 | 40 | 0 |
| Primene 81–R | 0.22 | 70 | 100 |
| Primene JM–T | 0.1 | 80 | 100 |
| Chromic Acid [1] (or Sodium Chromate) | 0.1 | 100 | 100 |
| Blank | 0 | 100 | 100 |

[1] Insoluble in gasoline.

As can be seen from the above, the tertiary alkyl amine chromates effectively reduce corrosion and are substantially more effective than their amine and acid parents.

Example XII

This example illustrates the corrosion inhibiting properties of the novel amine salts having at least one tertiary carbon atom when incorporated in lube oil.

The corrosion test procedure employed consists of placing a steel strip in a glass beaker covering the strip with a test oil and heating the beaker containing the covered strip to 140° F. for a period of 1 hour. The steel specimen is then removed and 1 drop of distilled water is placed on the specimen. The specimen is stored at 140° F. The corrosion test results are reported as the number of hours the drop of water remains on the steel strip at 140° F. before the first appearance of rust. The oil employed has the following approximate properties:

Gravity, ° API _____ 23
Flash, COC, ° F. _____ [1] 380
Visc., SSU:
    100° F. _____ 500
    130° F. _____ 195
Color, Lovi. 6″ _____ 45
Pour, ° F. _____ [2] −10

[1] Minimum.
[2] Maximum.

The amine salts employed in the above test were the amine neutral chromate salt and the amine neutral molybdate salt prepared in Examples III and X respectively. The amine neutral tungstate, sulfate and phosphate were also tested for comparative purposes. These latter three salts were prepared by the procedure of Example III except 0.25 mol tungstic, sulfuric and phosphoric acid were substituted respectively for chromic acid.

TABLE C
*Static water drop test data*

| Composition: | Hrs. to rust |
|---|---|
| Test oil+1% Primene JM–T neutral molybdate | 576 |
| Test oil+0.25% Primene JM–T neutral chromate | 144 |
| Test oil+1% Primene JM–T neutral tungstate | <24 |
| Test oil+1% Primene JM–T neutral sulfate | <24 |
| Test oil+1% Primene JM–T hydrogen phosphate | <24 |
| Test oil | <24 |
| Test oil+1% Primene JM–T | <24 |
| *Test oil+1% sodium chromate or chromic acid | <24 |
| *Test oil+1% sodium molybdate or molybdic acid | <24 |

*Chromic acid, molybdic acid, sodium chromate and sodium molybdate insoluble in test oil.

As can be seen from the above, the tertiary alkyl amine chromates and molybdates contemplated in our invention are effective corrosion inhibitors while similar salts of phosphates, sulfates and tungstates do not afford such protection. In addition, the above establishes tertiary alkyl amine chromates and molybdates as substantially more effective than their amine and acid parents.

All percentages, parts and ratios heretofore and hereafter recited are based on weight unless otherwise stated.

Obviously, many modifications and variations of the invention as hereinbefore set forth may be made without departing from the spirit and scope thereof and therefore only such limitations should be imposed as are indicated in the appended claims.

We claim:
1. A composition comprising a major amount of a petroleum liquid and a minor amount sufficient to inhibit corrosion of an amine salt of the formula

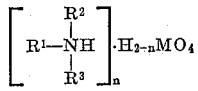

where $R^1$ is an alkyl radical of from 1 to 30 carbons, where $R^2$ and $R^3$ are radicals selected from the group consisting of hydrogen and alkyl of from 1 to 30 carbons, where M is a molybdic ion having a valence of +6 and where $n$ is an integer of from 1 to 2 inclusively.

2. The composition in accordance with claim 1 wherein the concentration of said salt in said composition is between about 0.005 and 5 wt. percent.

3. A composition in accordance with claim 1 wherein said $R^1$ is tertiary $C_{18}$–$C_{22}$ alkyl, said $R^2$ and $R^3$ are hydrogen, and said $n$ is 2.

4. A composition in accordance with claim 1 wherein said petroleum liquid is a mineral oil of lubricating viscosity.

5. A composition in accordance with claim 1 where $R^2$ and $R^3$ are hydrogen and where $R^1$ is an alkyl radical containing at least one tertiary carbon atom.

6. A composition in accordance with claim 5 where $R^1$ is a t-$C_{11}$–$C_{14}$ alkyl.

7. A composition in accordance with claim 5 where $R^1$ is a t-$C_{18}$–$C_{22}$ alkyl.

8. A composition in accordance with claim 5 where $R^1$ is t-butyl.

9. A composition in accordance with claim 1 where $R^2$ and $R^3$ are hydrogen and $R^1$ is dodecyl.

10. A lubricating composition comprising a major proportion of a mineral oil of lubricating viscosity and dissolved in said oil a salt of molybdic acid and an amine having the general formula:

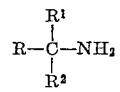

where $R^1$ and $R^2$ are both straight chain alkyl radicals having up to four carbons and R is an alkyl radical, the radicals R, $R^1$ and $R^2$ being such that the total number of carbons in the amine is from 16–30, said salt being present in an amount of from 0.2 to 5 weight percent.

References Cited by the Examiner
UNITED STATES PATENTS

| | | | |
|---|---|---|---|
| 2,294,525 | 9/1942 | Waugh | 252—49.7 |
| 2,692,195 | 10/1954 | Hannum et al. | 149—89 |
| 2,795,549 | 6/1957 | Abbott et al. | 252—49.7 |
| 2,795,550 | 6/1957 | Harle et al. | 252—49.7 |
| 2,863,891 | 12/1958 | Granchelli et al. | 260—429 |
| 2,909,541 | 10/1959 | Hugel | 260—429 |
| 2,995,555 | 8/1961 | Lauver | 260—438 |

OTHER REFERENCES

"Tertiary-Alkyl Primary Amines," published by Rohm & Haas Co., September 1954, pages 1, 2, 16–18.

"Tertiary-Alkyl Primary Amines," published by Rohm & Haas Co., October 1956, pages 1–9, 17–20 (most pertinent).

DANIEL E. WYMAN, *Primary Examiner.*

JULIUS GREENWALD, TOBIAS E. LEVOW, ALPHONSO D. SULLIVAN, *Examiners.*

J. L. FOLTZ, S. J. BAICKER, R. E. HUTZ, P. P. GARVIN, *Assistant Examiners.*